United States Patent
Riani et al.

(10) Patent No.: US 11,012,265 B1
(45) Date of Patent: *May 18, 2021

(54) SYSTEMS AND METHODS FOR RELATIVE INTENSITY NOISE CANCELATION

(71) Applicant: INPHI CORPORATION, Santa Clara, CA (US)

(72) Inventors: Jamal Riani, Fremont, CA (US); Ilya Lyubomirsky, Pleasanton, CA (US)

(73) Assignee: INPHI CORPORATION, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/991,927

(22) Filed: Aug. 12, 2020

Related U.S. Application Data

(63) Continuation of application No. 16/676,337, filed on Nov. 6, 2019, now Pat. No. 10,785,068.

(51) Int. Cl.
*H04B 10/69* (2013.01)
*H04L 25/03* (2006.01)
*H04L 25/06* (2006.01)
*H04B 10/516* (2013.01)
*H04B 10/58* (2013.01)

(52) U.S. Cl.
CPC ... *H04L 25/03057* (2013.01); *H04B 10/5161* (2013.01); *H04B 10/58* (2013.01); *H04B 10/6971* (2013.01); *H04B 10/6973* (2013.01); *H04L 25/062* (2013.01)

(58) Field of Classification Search
CPC .......................... H04B 10/695; H04B 10/697
See application file for complete search history.

(56) References Cited

U.S. PATENT DOCUMENTS

| | | | |
|---|---|---|---|
| 2015/0312056 A1* | 10/2015 | Zhang | H04L 1/0054 375/233 |
| 2016/0254866 A1* | 9/2016 | Blumenthal | H04B 10/5057 398/197 |

OTHER PUBLICATIONS

D. Lavery et al. "Digital Coherent Receivers for Long-Reach Optical Access Networks", Journal of Lightwave technology, vol. 31, No. 4, Feb. 15, 2013.

* cited by examiner

*Primary Examiner* — Shi K Li
(74) *Attorney, Agent, or Firm* — Richard T. Ogawa; Ogawa P.C.

(57) ABSTRACT

The present invention is directed to communication methods and systems thereof. In a specific embodiment, a noise cancelation system includes a slicer that processes a data stream generates both PAM symbols and error data. An RIN estimator generates RIN data based on the PAM symbols and the error data. A filter removes non-RIN information from the RIN data. The filtered RIN data includes an offset term and a gain term, which are used to remove RIN noise from the data stream. There are other embodiments as well.

20 Claims, 7 Drawing Sheets

SYSTEMS AND METHODS FOR RELATIVE INTENSITY NOISE CANCELATION

CROSS-REFERENCES TO RELATED APPLICATIONS

This application is a continuation of and claims priority to U.S. patent application Ser. No. 16/676,337, filed Nov. 6, 2019, now allowed, which is incorporated herein by reference in its entirety.

STATEMENT AS TO RIGHTS TO INVENTIONS MADE UNDER FEDERALLY SPONSORED RESEARCH AND DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention is directed to optical communication methods and systems.

Over the last few decades, the use of communication networks has exploded. In the early days of the Internet, popular applications were limited to emails, bulletin board, and mostly informational and text-based web page surfing, and the amount of data transferred was relatively small. Today, the Internet and mobile applications demand a huge amount of bandwidth for transferring photo, video, music, and other multimedia files. For example, a social network like Facebook processes more than 500 TB of data daily. With such high demands on data storage and data transfer, existing data communication systems need to be improved to address these needs. Optical communication systems are widely used for their high speed.

Relative intensity noise (RIN) is specific to optical communication systems, and continuous wave laser light sources tend to contribute to undesirable RIN. Over the past, there have been various conventional systems and methods for dealing with RIN, but they have been inadequate. Therefore, improved methods and systems for RIN cancellation is desired.

BRIEF SUMMARY OF THE INVENTION

The present invention is directed to communication methods and systems thereof. In a specific embodiment, a noise cancelation system includes a slicer that processes a data stream generates both PAM symbols and error data. An RIN estimator generates RIN data based on the PAM symbols and the error data. A filter removes non-RIN information from the RIN data. The filtered RIN data includes an offset term and a gain term, which are used to remove RIN noise from the data stream. There are other embodiments as well.

According to an embodiment, the present invention provides an optical receiver apparatus, which includes an optical interface for receiving optical signal via an optical communication link. The apparatus also includes a transimpedance module for converting the optical signal to an electrical signal. The apparatus further includes an analog-to-digital converter for converting the electrical signal to a digital data stream. The apparatus additionally includes a digital signal processor (DSP) for removing relative intensity noise (RIN) from the data stream. The DSP module is configured to generate first PAM symbols and first errors. The DSP module is further configured to generate a RIN data based on the first PAM symbols and the first errors. The DSP is additionally configured to remove non-RIN information from the first errors to generate filtered data. The filtered data includes an offset term and a gain term. The DSP is additionally configured to remove the offset term and the gain term from the data stream to generate a compensated data stream.

According to another embodiment, the present invention provides a noise cancelation system for optical communication, which includes a first slicer configured for generating first PAM symbols and error data based on a data stream. The system also includes a relative intensity noise (RIN) estimation module configured for generating RIN data based on the first PAM symbol and error data. The system additionally includes a filter for removing non-RIN information from RIN data and generate filtered data, which includes an offset term and a gain term. The system also includes a first compensation module configured to compensate the data stream using the offset term. The system further includes a second compensation module configured to compensate the data stream using the gain term. The system also includes a second slicer configured to generate second PAM symbols using the compensated data stream.

According to yet another embodiment, the present invention provides a method for removing relative intensity noise. The method includes converting optical signal to electrical signal. The method also includes converting electrical signal to data signal. The method additionally includes generating first PAM symbols and a first error data. The method further includes estimating a first RIN data based on the first PAM symbols and the first error data. The method further includes removing non-RIN information from the first RIN data to generate a second RIN data, which includes an offset term and a gain term. The method also includes generating second PAM symbols based on the data signal and the second RIN data.

It is to be appreciated that embodiments of the present invention provide many advantages over conventional techniques. Among other things, methods and systems according to the present invention can effectively and efficiently cancel RIN in optical communication systems. More specifically, noise cancellation mechanisms according to the present invention can specifically target and remove RIN, while there are other types of noises present in received optical signals. The RIN cancellation methods according to the present invention are particularly effective in PAM communication systems.

Embodiments of the present invention can be implemented in conjunction with existing systems and processes. For example, RIN cancellation mechanisms according to the present invention can be readily incorporated into existing systems. For example, a RIN cancellation DSP can be programmed into existing microprocessors. In various embodiments, RIN cancellation is performed by specialized circuits (e.g., ASIC), and these specialized circuits can be readily incorporated into existing communication systems as well.

The present invention achieves these benefits and others in the context of known technology. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

DETAILED DESCRIPTION OF THE INVENTION

The present invention is directed to communication methods and systems thereof. In a specific embodiment, a noise cancelation system includes a slicer that processes a data stream generates both PAM symbols and error data. A RIN estimator generates RIN data based on the PAM symbols and the error data. A filter removes non-RIN information from the RIN data. The filtered RIN data includes an offset term and a gain term, which are used to remove RIN noise from the data stream. There are other embodiments as well.

As explained above, while optical data communication systems can provide high bandwidth, there are specific challenges. Among other things, optical communications need to address the relative intensity noise (RIN), which attributes to instability in power level of laser sources.

Figure 1:
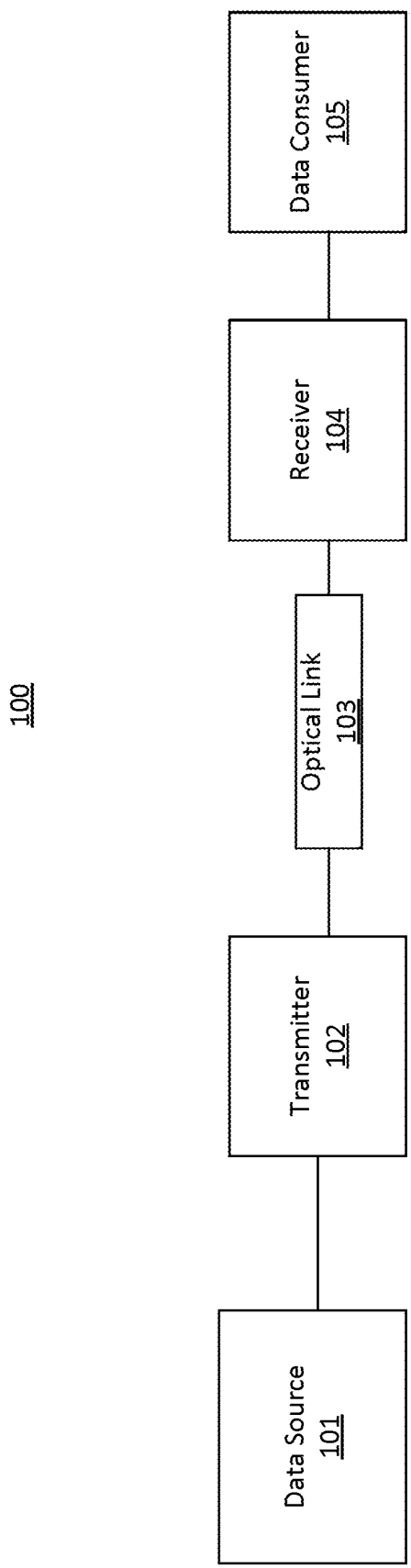
FIG. 1 is a simplified diagram illustrating a data communication system according to embodiments of the present invention.

FIG. 1 is a simplified diagram illustrating a data communication system 100 according to embodiments of the present invention. This diagram is merely an example, which should not unduly limit the scope of the claims. One of ordinary skill in the art would recognize many variations, alternatives, and modifications. Information from data source 101 is to be transmitted via transmitter 102. For data transmission over optical link 103, transmitter 102 performs a number of processes. For example, data from data source 101 are converted to analog signal, which is used to generate a driver signal. The drive signal modulates a laser light source to generate a modulated light signal. For example, the laser light source for data transmission is usually implemented using a continuous wave (CW) laser, which introduces RIN. The light signal, transmitted via optical link 103, is processed by receiver 104. Receiver 104 converts optical signal to electrical signal, and then converts electrical signal to data signal. For example, to perform these functions, receiver 104 may include optical receiver, transimpedance (TIA), continuously time linear equalizer (CTLE), analog to digital converter (ADC), PAM slicers, decoder, and/or other components. During the conversion processes, receiver 104 removes analog and digital noises. According to various embodiments, the present invention removes RIN using digital signal processing techniques, which can be implemented as a functionality of receiver 104 or other components. The output of receiver 104 is provided to the data consumer 105 as shown. For example, data consumer 105 may be a server, end user, network device, or others.

Figure 2:
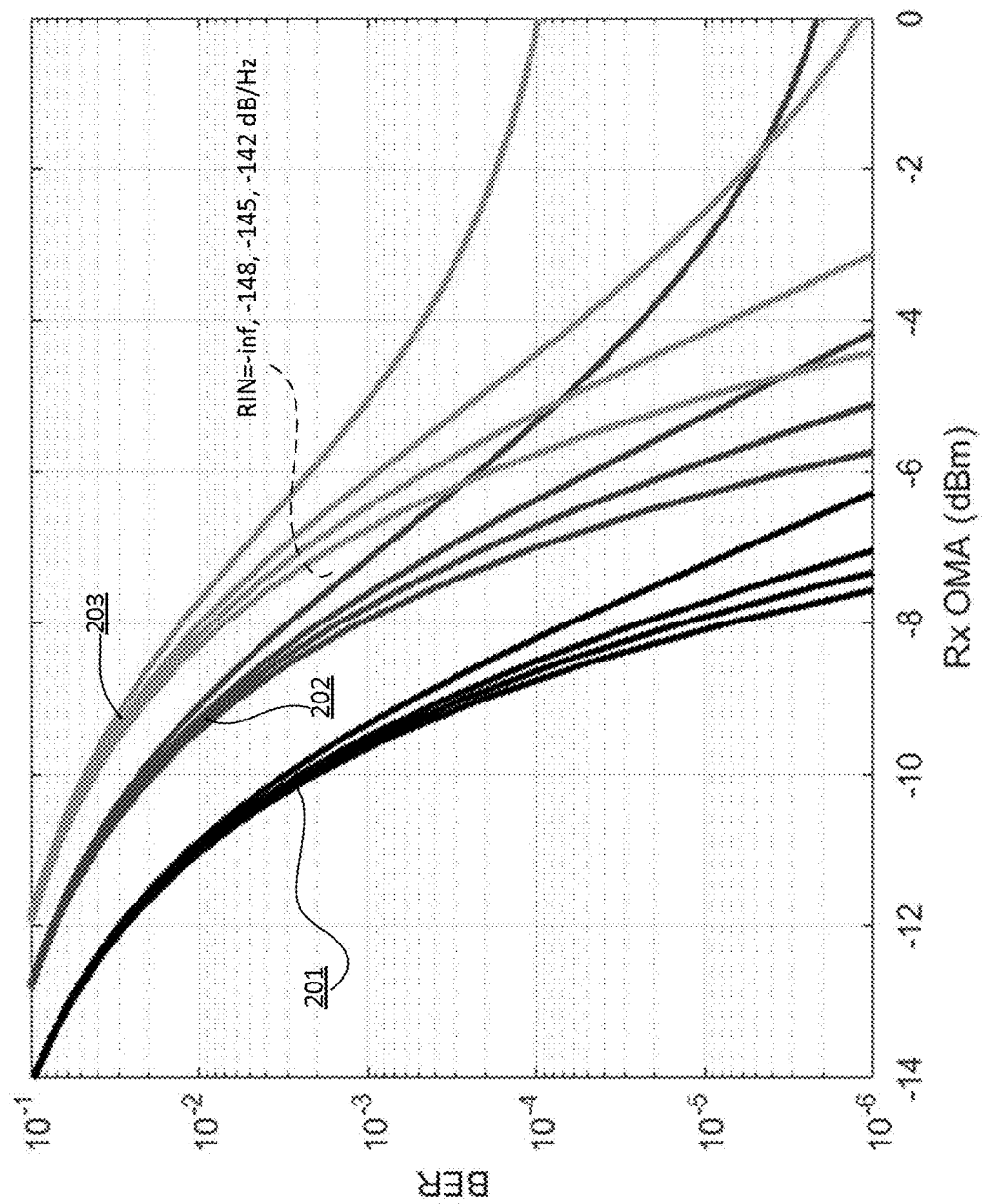
FIG. 2 is a plot illustrating RIN in data communication.

FIG. 2 is a plot illustrating RIN in optical communication. More specifically, for the purpose of illustration, the RIN in 200G PAM modulation corresponds to PAM order M=4 (plot 201), M=6 (plot 202) and M=8 (plot 203). As can be seen in FIG. 2, RIN contributes to bit error rate (BER) related to the optical modulation amplitude (OMA) levels at the receivers. It is to be appreciated that embodiments of the present invention effective cancel and reduce RIN, thereby also improving system performance measured in BER.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

Figure 3:
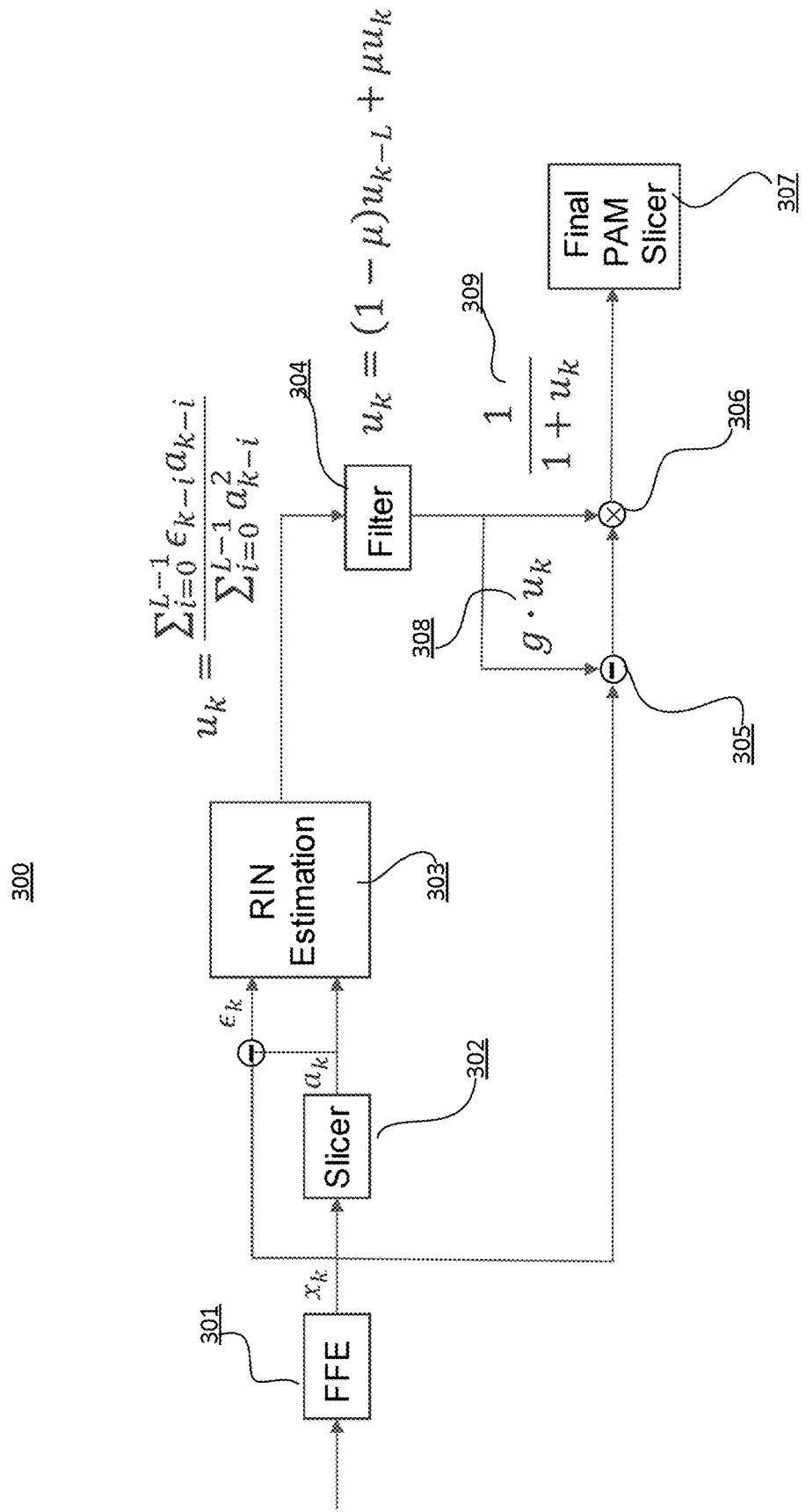
FIG. 3 is a simplified block diagram illustrating a system for RIN cancellation according to embodiments of the present invention.

FIG. 3 is a simplified block diagram illustrating a system for RIN cancellation according to embodiments of the present invention. This diagram is merely an example, which should not unduly limit the scope of the claims. One of ordinary skill in the art would recognize many variations, alternatives, and modifications.

In various embodiments, a RIN cancellation device according to the present invention processes data in the digital domain. For example, the RIN cancellation device may be implemented as a DSP component in an optical communication apparatus of system. In an exemplary implementation, optical signal is converted to analog electrical signal. An ADC converts the analog electrical signal to digital signal. The digital signal is first processed by a feed-forward equalizer (FFE) module. The output of the FFE module is then processed by a slicer module. The slicer module is configured to provide a preliminary error determination and PAM symbols. The error determination includes both a RIN component and non-RIN components (e.g., receiver noise, etc.). The RIN estimation module determines an amount of noise based on the error estimation and signal output. The estimation from RIN estimation module includes both RIN component and non-RIN component. A filter module is configured to remove the non-RIN component. For example, since RIN is generally at low frequency, the filter module may simply be a low-pass filter (e.g., implemented using a leaky integrator). The RIN component, after filtering, includes two terms. The first term is a DC offset term. The second term is a gain term. Both the offset term and the gain term are used during the RIN cancelation process.

For direct-detect applications where RIN is concentrated mostly up to frequency $f_c$ where $f_c \ll \frac{1}{2}T$, and $1/T$ is the link baud-rate. The RIN mainly translates into two terms at the final slicer input (e.g., slicer 307). The first term is a time-varying DC offset following the same power spectral density (PSD) of the laser RIN. The second term is a time-varying amplitude modulation term, i.e., gain term. To address the RIN, the first term needs a fast DC compensation loop, which can be configured as feedback or feed-forward depending on the ratio of RIN corner frequency to a baud rate of $2f_cT$.

The laser electrical field can be described with Equation 1 below:

$$E_t(t) = (A + r(t))e^{j\phi(t)} \quad \text{Equation 1:}$$

where $A^2$ is nominal laser intensity; and $r(t)$ models the RIN amplitude noise with PSD concentrated in frequency region $< f_c$ After modulation (e.g., as performed by EML/MZ, or DML), the modulator output of electrical field can be described in Equation 2:

$$E_m(t) = E_t(t) M(v(t)) e^{j\psi(t)} \quad \text{Equation 2:}$$

where $M(v(t))$ describes the modulator voltage-to-intensity modulation.

At the receiver side, optical signal is first processed by a photodetector (PD). A transimpedance amplifier (TIA) converts optical signal to electrical signal. The TIA and baud rate sampling are described in Equation 2 below:

$$P_r(d_k) = \left(1 + \frac{r(kT)}{A}\right)^2 P_i(d_k) \quad \text{Equation 2}$$

where $P_i(d_k)$ is the ideal (without RIN) received intensity/voltage for transmitted symbol $d_k$ and $P_r$ is the actual received intensity with presence of RIN.

Knowing that $r/A \ll 1$ and taking the average received power $P_{av}$ into account, the received intensity $P_r$ can be in Equation 3 below:

$$P_r(d_k) \cong (1 + u_k) P_{av} + (1 + u_k)(P_i(d_k) - P_{av}) \cong$$

$$P_{av} + u_k P_{av} + G \times (1 + u_k)(2d_k - (M-1)) \quad \text{Equation 3:}$$

where $$u_k = \frac{2r(kT)}{A},$$

G is the ideal ratio of received intensity relative to PAM-M level; $d_k \in \{0 \ldots M-1\}$, e.g., for PAM-4, the term $2d_k - (M-1)$ corresponds to values in $\{\pm 3, \pm 1\}$.

In a general formulation, the latter term corresponds to the average PAM levels and is not necessarily linear with the PAM data values. These PAM levels are a function of the transmitter and driver linearity, modulator bias, input swing, and modulator input-output characteristics, among other factors.

In Equation 3, the first term $P_{av}$ is a DC term that can be eliminated by AC-coupling. The second term $u_k P_{av}$ is the time-varying low frequency/DC term. For example, this term has the same spectral density as the RIN itself, as $u_k$ is the sampled and scaled version of r(t). This time-varying DC component with spectral content (e.g., concentrated up to 100 MHz) can be handled by a DC feedback compensation loop, which has the bandwidth of a few MHz limited by its loop latency. It is followed by a DC feedforward correction loop. In various implementations, the tracking bandwidth scales with baud-rate for higher rates.

The third term in Equation 3 describes the amplitude modulation resulting from intensity modulation. For example, embodiments of the present invention use this third term for estimating RIN-induced gain error based on prior knowledge of transmitted symbols (e.g., preliminary decisions), or joint RIN and symbol detection can be used. In various embodiments, the present invention uses preliminary knowledge of RIN PSD and incorporates this knowledge into the estimation process. For example, the third term is based on preliminary PAM decisions from a first slicer (e.g., slicer 302 in FIG. 3) for estimating the gain error term $u_k$, which is then filtered properly to match the corner frequency $f_c$ and compensated in a feed-forward fashion.

Below is Equation 4 for estimating the gain error $u_k$. In Equation 4, $e_k$ is the the error signal, which is related to the difference between equalizer output and the PAM decisions $a_k = 2d_k - (M-1)$, ignoring the RIN noise induced gain error (i.e., the first stage slicer output). The instantaneous gain error estimate based on a block of data of length L is $$\frac{\sum_{i=0}^{L-1} e_{k-i} a_{k-i}}{\sum_{i=0}^{L-1} a_{k-i}^2},$$

and given the proper choice of filtering parameter u matching the ratio of Baud rate to $f_c$, the gain error estimate can be written in Equation 4 as:

$$\hat{u}_k = (1 - \mu)\hat{u}_{k-L} + \mu \frac{\sum_{i=0}^{L-1} e_{k-i} a_{k-i}}{\sum_{i=0}^{L-1} a_{k-i}^2} \quad \text{Equation 4}$$

Now referring back to FIG. 3. The feedforward equalizer (FFE) 301 receives digital data for equalization. For example, the digital data may be provided by an ADC module, as explained above (e.g., ADC and FFE both being components of receiver 104). The FFE 301 generates an equalized output $x_k$ as shown. Slicer 302 performs preliminary estimate on $x_k$. For example, for PAM-4 communication, slicer 302 estimates and selects one of four levels for each data symbol. The output of slicer 302 includes error estimation $e_k$ and data $a_k$. The RIN estimation block 303 determines, based on $e_k$ and $a_k$, the amount of RIN noise that needs to be filtered. As explained above, RIN $u_k$ is described in Equation 4 and illustrated in FIG. 3. For example, the RIN estimator block 303 performs RIN calculations using equations described above. In data communication systems, there are generally more than one types of noises. Filter 304 is configured to remove non-RIN noises. For example, filter 304 may be implemented with one or more low-pass filters (LPF). In certain embodiments, filter 304 is implemented using one or more leaky integrators. The output of filter 304 comprises two terms for compensation. For simplification, the two terms include offset term 308 and gain term 309. Offset compensator 305 applies offset term 308, and gain compensator 306 applies the gain term 309. Final PAM slicer (e.g., a PAM slicer) 307 is configured to generate PAM symbols using data after RIN cancelation has been applied.

Depending on the implementation, RIN cancelation system 300 can be implemented in various ways. For example, functional blocks in FIG. 3 can be implemented as algorithms built into microprocessor and/or DSP chips. In a specific implementation, system 300 is coded into an ASIC chip.

Figure 4:
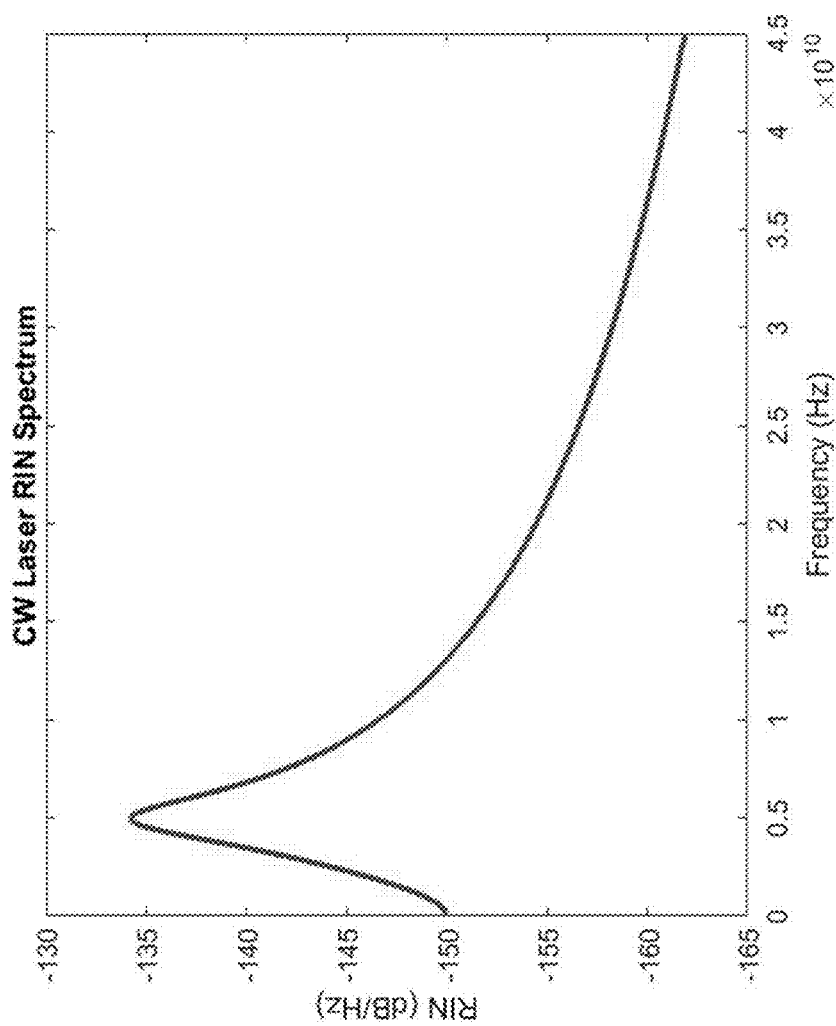
FIG. 4 is a plot illustrating a CW laser RIN spectrum.

FIG. 4 is a plot illustrating a CW laser RIN spectrum for a PAM-6 optical communication system. As shown, for a continuous wave laser, RIN is present at different amplitudes across a frequency spectrum.

Figure 5:
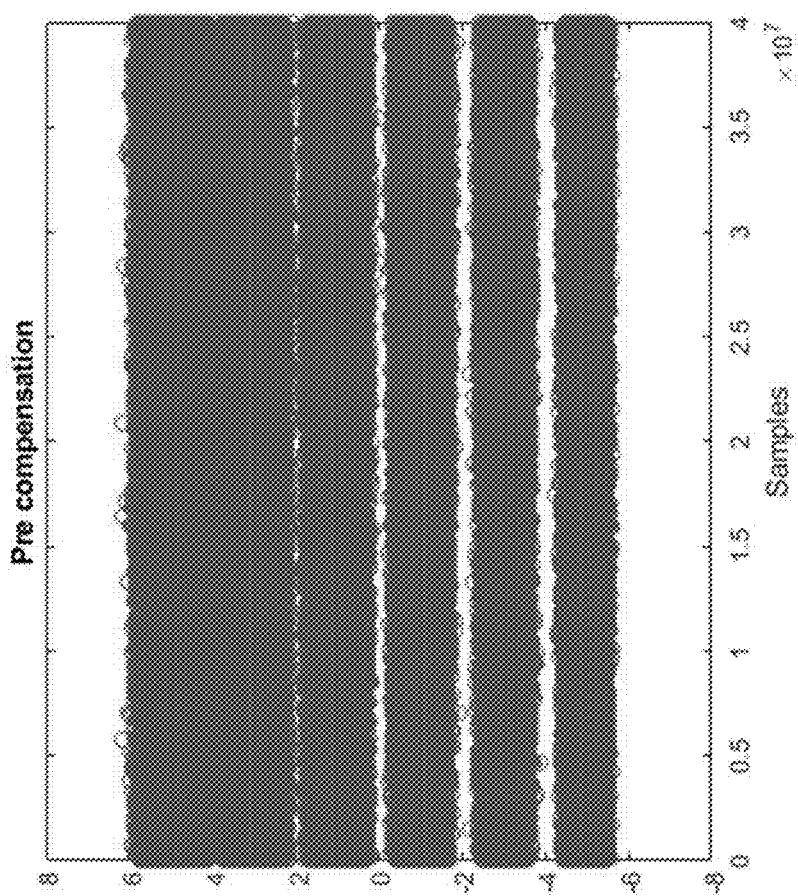
FIG. 5 is a plot illustrating RIN noise before noise cancellation.

FIG. 5 is a plot illustrating RIN noise before noise cancellation for the PAM-6 optical communication system. For PAM-6 communication, there are six levels, and RIN is worst at higher levels (e.g., region between "4" and "6"). For example, RIN contributes to a bit rate error (BER) of $1e^{-6}$.

Figure 6:
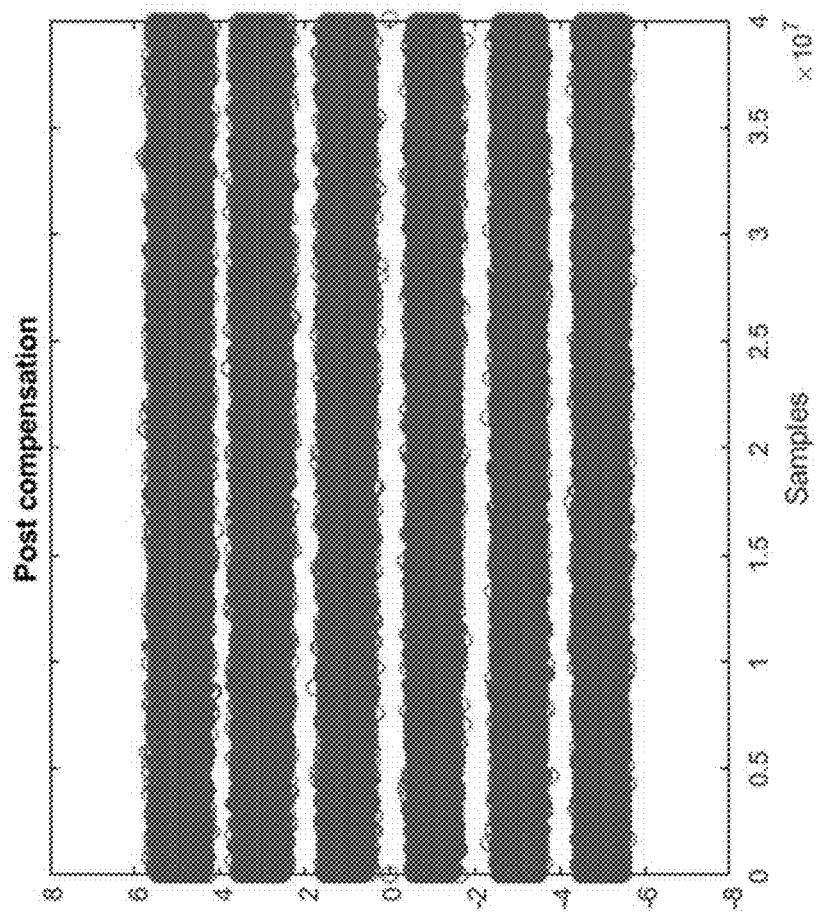
FIG. 6 is a plot illustrating RIN noise after noise cancellation.

FIG. 6 is a plot illustrating RIN noise after noise cancellation for the PAM-6 optical communication system. As shown in FIG. 6, most of the RIN is removed, and the BER can be almost zero.

Figure 7:
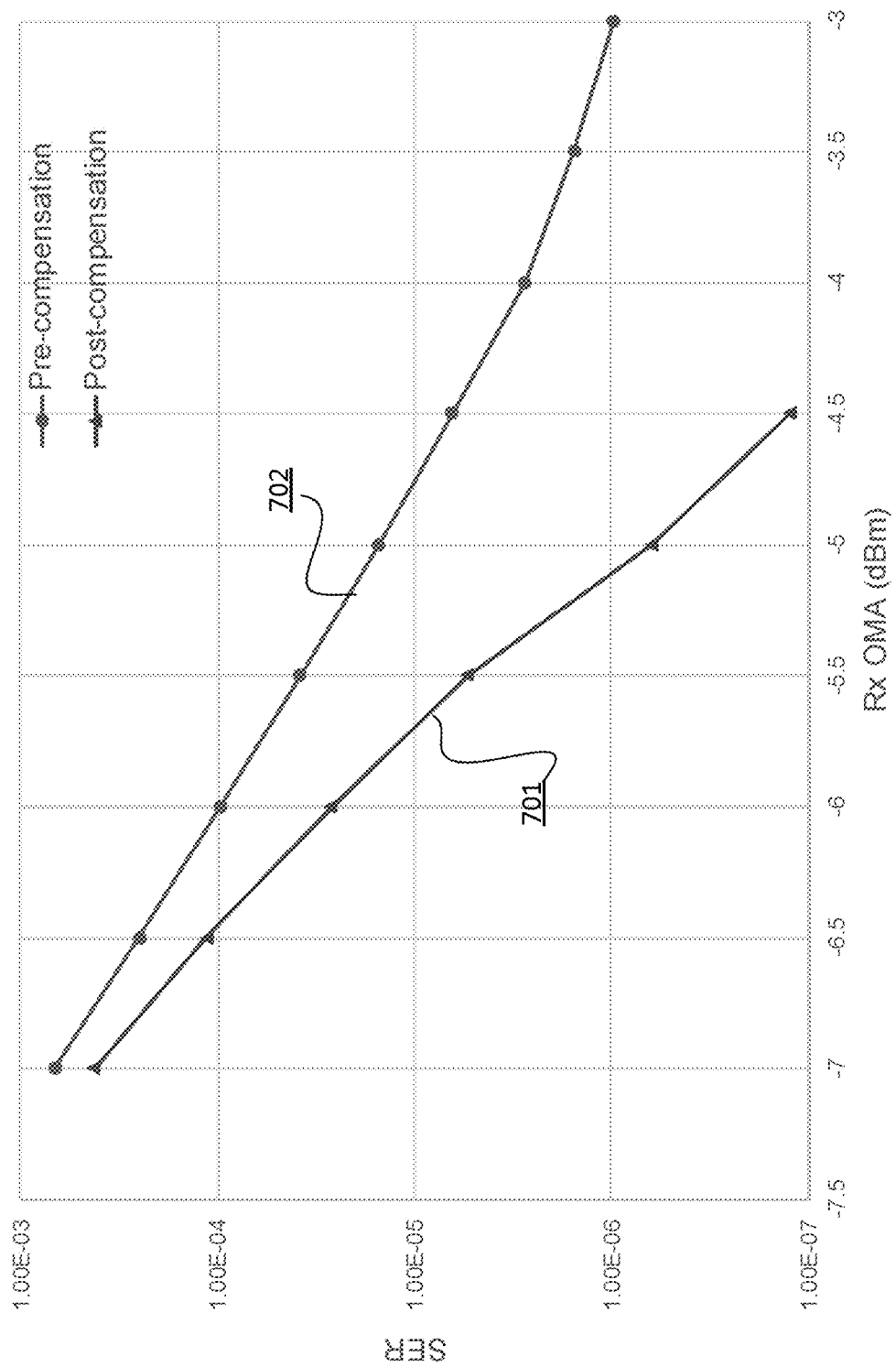
FIG. 7 is a plot illustrating RIN noise in PAM-6 communication.

FIG. 7 is a plot illustrating RIN noise in PAM-6 communication. As can be seen in FIG. 7, RIN is much lower after compensation (plot 701). Compared to pre-compensation plot 802, the post compensation RIN is much lower at higher OMA.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A noise cancelation system for optical communication, the system comprising:
an equalizer configured to equalize an incoming data stream to generate an equalized data stream;
a first slicer configured for generating first data and error data based on the equalized data stream;
a relative intensity noise (RIN) estimation module configured for generating RIN data based on the first data and the error data, the error data comprising RIN information and non-RIN information;
a filter for removing the non-RIN information and generating filtered data, the filtered data comprising an offset term and a gain term; and
a compensation module configured to compensate the equalized data stream using the offset term and the gain term.

2. The system of claim 1 further comprising a feedforward equalizer (FFE) equalizing a converted data stream and generating the data stream.

3. The system of claim 2 further comprising an analog-to-digital converter (ADC) for converting an electrical signal to the converted data stream.

4. The system of claim 3 further comprising a transimpedance module for converting an optical signal to the electrical signal.

5. The system of claim 4 further comprising an optical receiver for receiving the optical signal.

6. The system of claim 4 further comprising an equalizer for processing the electrical signal.

7. The system of claim 1 wherein the filter comprises a low-pass filter.

8. The system of claim 1 wherein the filter comprises a leaky integrator.

9. The system of claim 1 wherein the first data comprise PAM symbols.

10. The system of claim 1 wherein the non-RIN information includes a transimpedance noise.

11. An optical receiver apparatus comprising:
a transimpedance module for converting an optical signal to an electrical signal, the electrical signal comprising transimpedance noise;
an analog-to-digital converter for converting the electrical signal to a digital data stream;
a first slicer configured to generate data symbols and error data based on the digital data stream;
an error estimator configured to generate RIN data based at least on the error data, the RIN data comprising RIN information and non-RIN information, the non-RIN information being associated with the transimpedance noise;
a filter configured to remove non-RIN information an offset term and a gain term; and
a compensation module configured to remove the offset term and the gain term from the digital data stream.

12. The apparatus of claim 11 further comprising a second slicer configured to generate PAM symbols by processing digital data stream.

13. The apparatus of claim 11 further comprising a continuous time linear equalizer module for equalizing the electrical signal.

14. The apparatus of claim 11 wherein the filter comprises a low-pass filter.

15. The apparatus of claim 11 wherein the first slicer is configured to generate PAM symbols.

16. The apparatus of claim 11 further comprising a digital signal processor (DSP), the DSP module comprising the first slicer, the first error estimator, the filter, and the compensation module.

17. The apparatus of claim 16 wherein the DSP is implemented using a microprocessor.

18. A method for removing relative intensity noise, the method comprising:
equalizing an incoming data stream to generate an equalized data stream;
generating first payload symbols and first error data based on the equalized data stream;
estimating a first RIN data based on the first payload symbols and the first error data;

removing non-RIN information from the first RIN data to generate a second RIN data, the second RIN data includes an offset term and a gain term; and generating second payload symbols based on the data signal and the second RIN data.

19. The method of claim 18 further comprising converting an analog data stream to the incoming data stream.

20. The method of claim 18 wherein the first payload symbols comprise PAM symbols.

* * * * *